Patented June 11, 1940

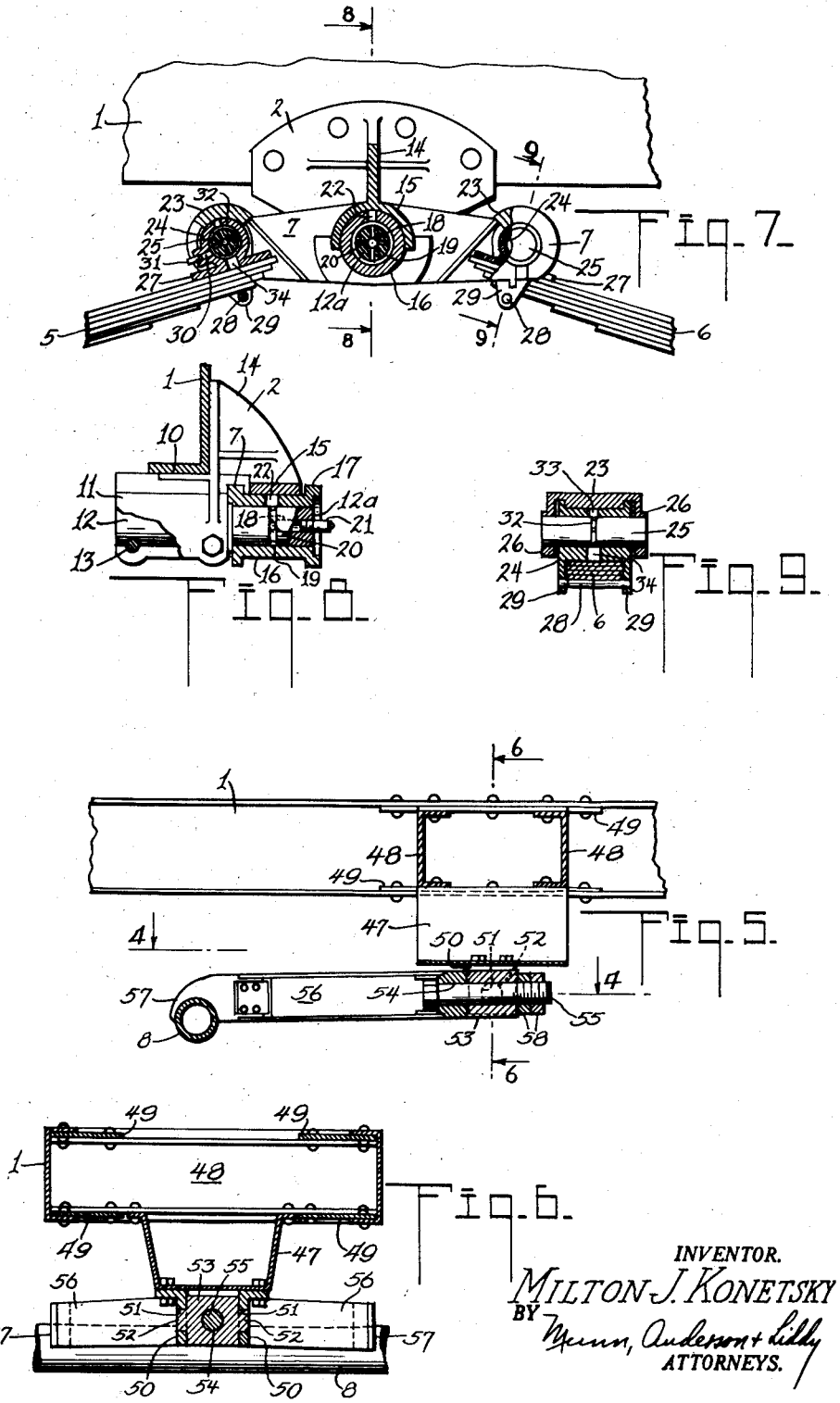

2,204,087

UNITED STATES PATENT OFFICE 2,204,087

TANDEM AXLE ASSEMBLY

Milton J. Konetsky, San Francisco, Calif.

Application July 23, 1937, Serial No. 155,256

7 Claims. (Cl. 280—124)

My invention relates to improvements in a tandem axle assembly, and it consists of the combinations, constructions and arrangements hereinafter described and claimed.

An object of my invention is to provide a tandem axle assembly in which all of the springs are provided with a floating connection with the axles and in which the ends of the springs have a sliding connection with brackets that are secured to a vehicle chassis. The fact that the centers of the springs have a free floating connection with the axles does away with the springs being subjected to an enormous torque when the brakes are applied to the wheels. This will not only give the springs a longer life, but all the wheels will be subjected to an equal braking action resulting in a full brake equalization for the device. The bouncing of the wheels when the brakes are applied will also be prevented with this free floating spring support whether the vehicle is empty or loaded. Since the brakes will always be equally applied due to their freedom from spring torque, a longer life will be given to the brakes and to the tires.

I further provide a combination radius rod and torque arm for the axle which will always keep the axle in proper alignment while leaving freedom for the springs. The arrangement of the parts further gives a full oscillating rear-end. The vertical swinging of the axles due to raises and depressions in the road are taken care of by the combination radius rod and torque arm. The springs are not only relieved of all braking action, but they are also freed from all driving torque. The combination radius rod and torque arm permits a greater axle oscillation without any binding or twisting effect being transmitted to the vehicle frame. The braking efficiency of the device is greatly increased because all of the wheels are subjected to an equal braking action. This permits the use of larger brakes and results in a greater braking power.

One of the principal objects of the invention lies in the fact that the load is always equally distributed on both ends of the springs and the springs only perform the function of carrying the load. The springs do not hold the axles in alignment nor do they take any braking torque, nor do they absorb any driving load shock. The result is that the springs will have a longer life and the device will operate more efficiently.

Other objects and advantages will appear in the following specification, and the novel features of the device will be particularly pointed out in the appended claims.

My invention is illustrated in the accompanying drawings forming a part of this application, in which Figure 1 is a plan view of the device shown operatively applied to a trailer;

Figure 5 is a section along the line 5—5 of Figure 1;

Figure 6 is a section along the line 6—6 of Figure 5;

Figure 7 is a section along the line 7—7 of Figure 1;

Figure 8 is a section along the line 8—8 of Figure 7; and

Figure 9 is a section along the line 9—9 of Figure 7.

Figure 1:
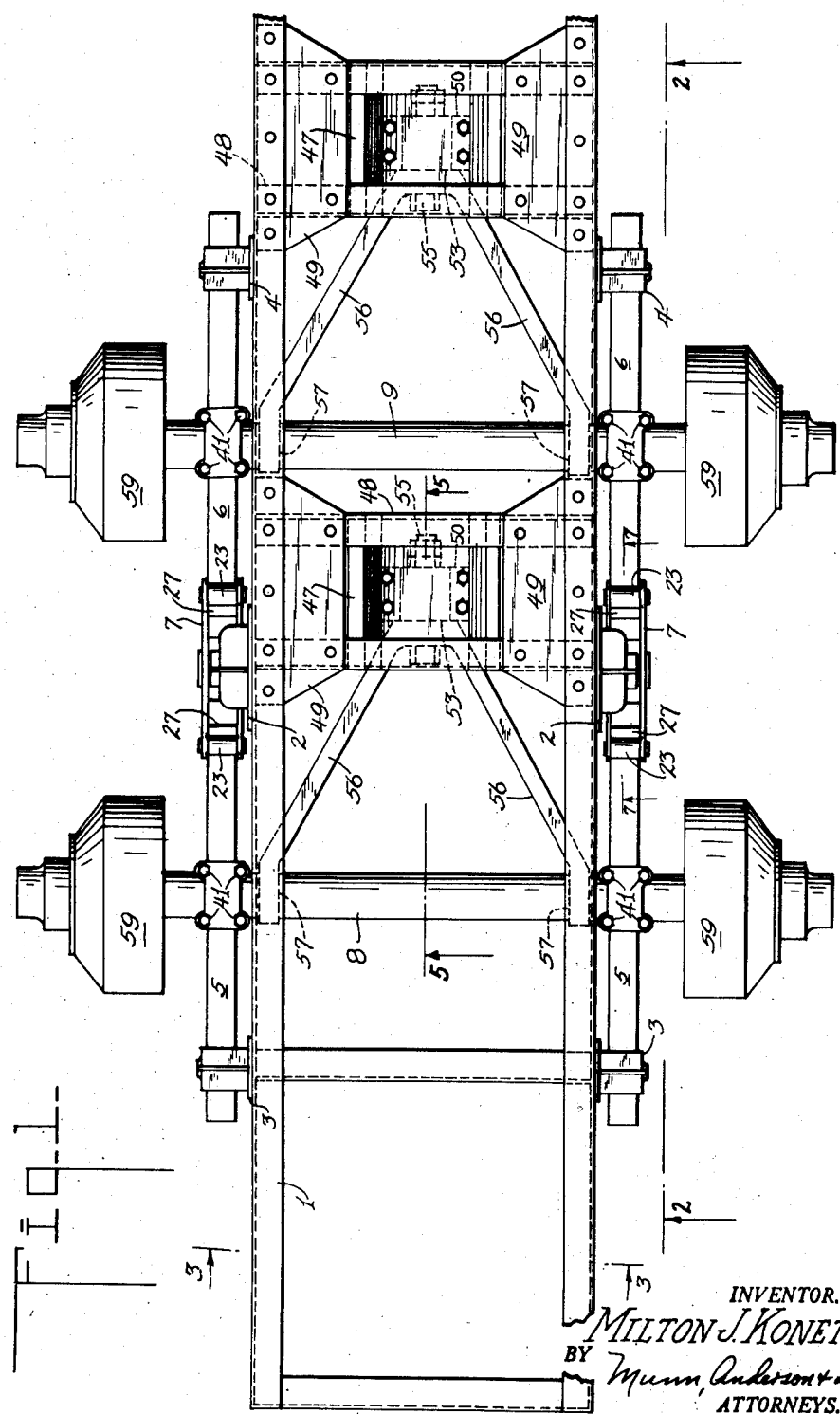
Figure 2:
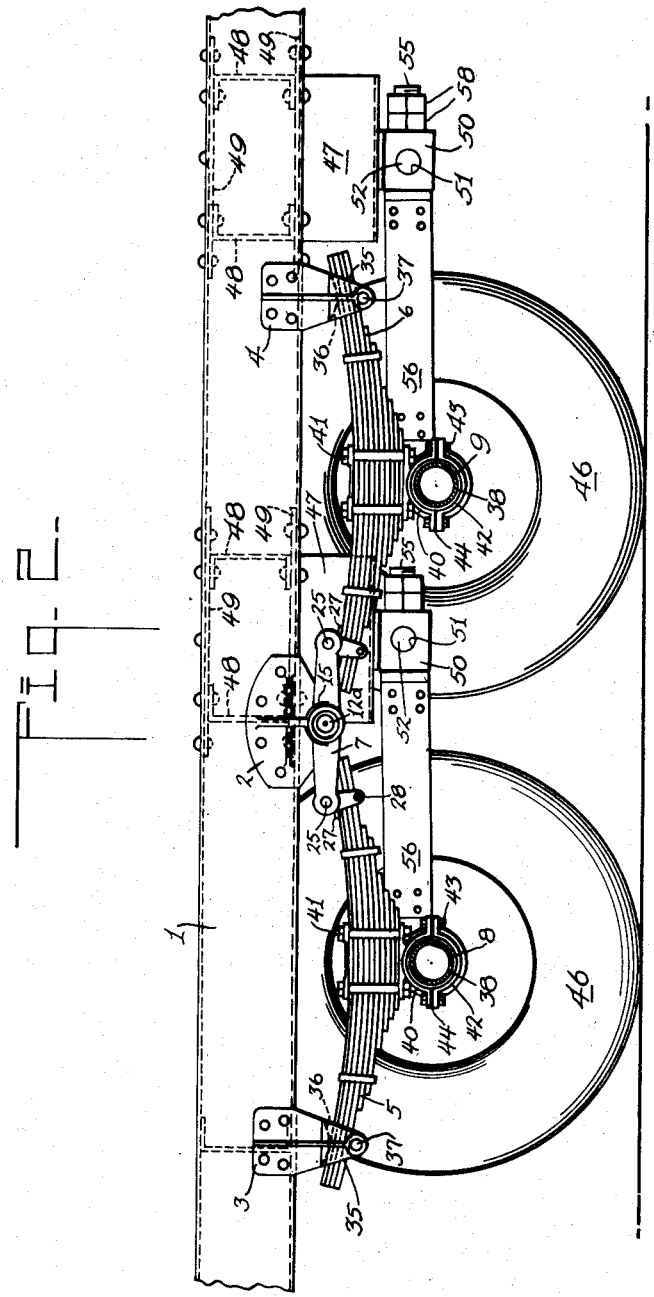
Figure 2 is a section along the line 2—2 of Figure 1.
Figure 3:
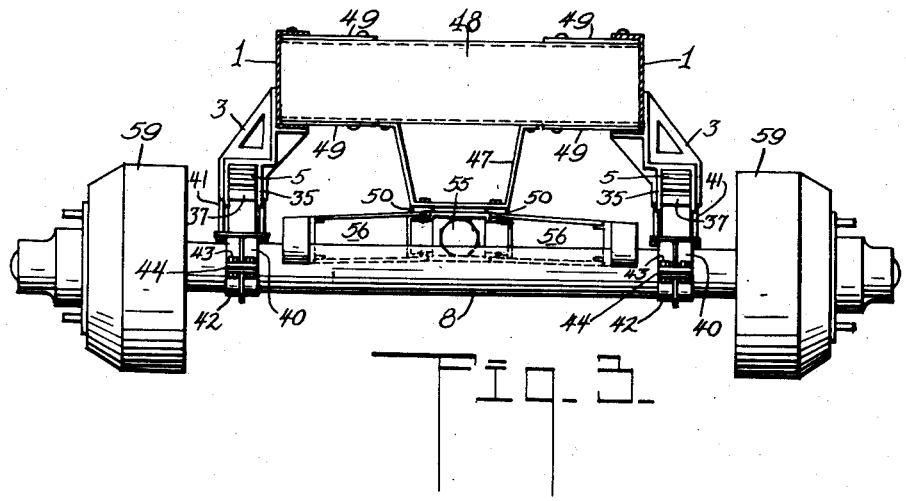
Figure 3 is a section along the line 3—3 of Figure 1.

In carrying out my invention I make use of a vehicle, such as a trailer indicated generally at 1 in Figures 1, 2, and 3. This trailer is supported by my device and it will be seen from Figures 1 and 2 that a central bracket 2 is attached to the trailer chassis 1 and is disposed midway between the brackets 3 and 4. Figure 1 shows a set of brackets 2, 3 and 4 disposed on each side of the vehicle. Leaf springs 5 are disposed between the brackets 2 and 3, and leaf springs 6 are disposed between the brackets 2 and 4.

It will be noted that each leaf spring 5 has its inner end slidably connected to a frame 7 that is pivotally carried by the bracket 2, in a manner hereinafter described. The outer end of the leaf spring 5 is slidably mounted in the bracket 3, and the central portion of the spring has a floating connection with a rear axle 8. In like manner, the inner end of the spring 6 is slidably connected to the opposite end of the frame 7, and the central portion of this spring is provided with a floating connection with a front axle 9 of the device. The outer end of the spring has a sliding connection with the bracket 4.

It is best first to describe the construction of one of the brackets 2 and its associate mechanism, then to describe the connections of the leaf springs 5 and 6 with the brackets 3 and 4, and finally to describe the floating connections of the springs with the axles 8 and 9. In Figures 7, 8 and 9, I show the particular construction of the bracket 2 and the frame 7. This part of the device is described and claimed in Patent No. 2,024,528, issued December 17, 1935.

The bracket 2 has a seat 10 that rests against the trailer chassis 1, see Figure 7. The bracket carries a split sleeve 11, see Figure 8, and the sleeve in turn supports a pin 12. The pin is held against rotation by bolts 13 and these bolts cause the sleeve to grip the pin, and further the bolts enter grooves in the pin to prevent the pin from rotating. The bracket has a vertical fin 14 and a curved bearing member 15.

The frame 7 has a central cylindrical portion or sleeve 16 that rides on a reduced portion 12a of the pin 12 and the sleeve 16 bears against the curved bearing member 15. The portion of the frame 7 adjacent to the sleeve 16 and an annular flange 17 on the sleeve, bear against opposite ends of the bearing 15 and limit the longitudinal movement of the sleeve 16 on the reduced pin portion 12a.

The portion 12a of the pin has a central bore 18 for carrying a lubricant such as grease, and Figures 7 and 8 show the bore 18 communicating with an annular groove 19 by means of radially extending passages 20. A grease gun fitting 21 closes the outer end of the bore 18 and traps the grease within the bore. The sleeve 16 is provided with an opening 22 that communicates with the groove 19 and in this way the lubricant is conveyed to the abutting surfaces of the curved bearing member 15 and the sleeve 16. The lubricant also lubricates the outer surface of the pin portion 12a and the bore of the sleeve 16. In this way the parts can be thoroughly lubricated from a common source of lubrication.

The manner of connecting the ends of the springs 5 and 6 to the ends of the frame 7 will now be described. Each end of the frame 7 carries a curved portion 23 and since both are of identical construction, a description of one will be given and like reference numerals will be applied to corresponding parts. Within the curved portion 23, I mount a spring hanger 24 and Figure 9 shows the hanger rotatably carried by a pin 25 that in turn is supported by depending portions 26 on the curved portion 23. The spring hanger 24 has a bearing plate 27 that rides on the spring end of either the leaf spring 5 or the leaf spring 6. The leaf springs have their ends held in place by a pin 28 that is passed through depending arms 29 carried by the spring hanger 24.

The manner of lubricating the spring hanger 24 and the bearing plate 27 is shown in Figures 7 and 9 and comprises a passageway 30 for a lubricant, this passageway being closed at its outer end by a grease gun fitting 31. The passageway 30 communicates with the interior of the spring hanger 24. The pin 25 has an annular groove 32 communicating with the passage 30 and this groove also communicates with two openings 33 and 34 in the spring hanger 24. The opening 33 conveys the lubricant to the abutting surfaces on the curved portion 23 and the outer surface of the hanger 24, while the opening 34 conveys the lubricant to the abutting surfaces of the bearing plate 27 and the leaf spring end. In this way the various parts are lubricated from one fitting 31.

The brackets 3 and 4 are identical in construction and each has a fork-shaped portion 35, see Figure 2, with an arcuate bearing surface 36 against which the leaf springs bear. A pin 37 is passed through the outer ends of the forked portions 35 and holds the leaf spring ends in place while permitting a sliding movement. If desired the type of bracket shown in Patent No. 2,061,199 and issued November 17, 1936, may be substituted for the brackets 3 and 4.

Figure 4:
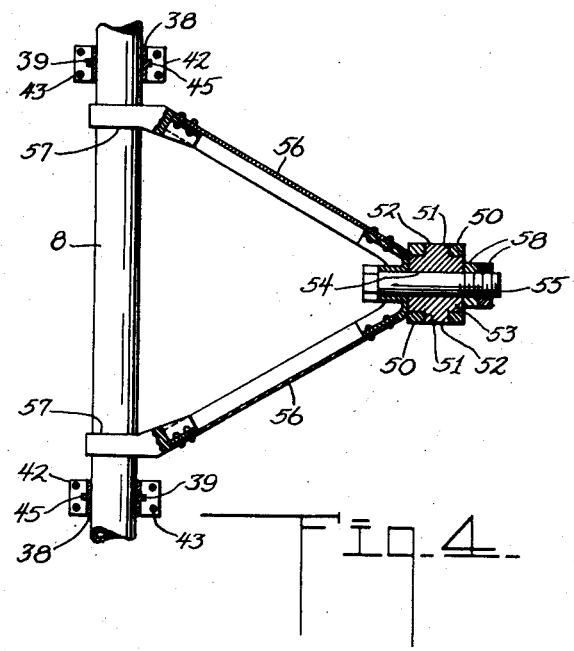
Figure 4 is a section along the line 4—4 of Figure 5.

The particular manner of providing a floating connection between the springs 5 and 6 and the axles 8 and 9 is shown in Figures 2, 3, and 4. In Figure 4 the axle 8 is shown provided with sleeves 38 that are preferably welded to the axle. These sleeves carry an annular flange 39. Each leaf spring is connected to an upper bearing member 40, see Figures 2 and 3, by bolts 41. This bearing member is connected to a lower bearing member 42 by bolts 43. Shims 44 are placed between the bearing members 40 and 42 and space them apart a distance which will cause the completed bearing to freely rotate on the sleeve 38. The bearing halves have grooves 45, shown in Figure 4, for receiving the flanges 39 and in this way longitudinal movement of the bearing halves along the axles is prevented. As wear takes place between the bearings and the sleeves, additional shims 44 may be removed.

It will be seen from Figure 2 that as the wheels 46 move vertically due to road surface inequalities, the springs 5 and 6 will be flexed and will aid each other by means of the frames 7. For example, should the rear wheels 46 be raised due to a bump in the road, the springs 5 will be raised and this will cause the frames 7 to be rocked in a clock-wise direction about the pin portions 12a. The frames 7 will transmit the movement, and therefore the force of the blow to the springs 6, because the end portions of the frames engaging with the springs 6, will be moved downwardly. The springs 6 will therefore aid in absorbing the shock delivered to the springs 5 by the upwardly moving rear wheels 46. In the same manner, the springs 5 will aid the springs 6 when they are flexed upwardly by the front wheels 46 being raised vertically.

The device is also constructed to permit an oscillation of either or both of the axles 8 and 9 without this movement tending to bind or twist the vehicle frame. Should, for example, one wheel 46 on the axle 8 move upwardly while the other wheel on the same axle moves downwardly, the rear axle will swing in a vertical plane. I provide an attachment for the rear axle that will connect the axle with the trailer chassis and permit the axle to freely oscillate. Since both axles 8 and 9 are provided with a similar connection with the chassis, I will only describe one of the assemblies and like reference numerals will be applied to corresponding parts.

In Figures 5 and 6 I show a supporting member 47 that is secured to channel irons 48 which in turn are connected to the trailer chassis 1 by plates 49, see Figure 1. The support 47 carries downwardly extending ears 50 and these ears have aligned openings 51 for receiving trunnions 52 that are integral with a block 53. Figure 5 shows the block 53 as being provided with a bore 54 and a bolt 55 extends through this bore.

Referring now to Figure 4, I show the bolt 55 connecting a combined radius rod and torque arm indicated at 56 to the block 53. The torque arm 56 is designed to rotate about the bolt 55 as an axis and the free ends of the torque arm are welded or otherwise suitably secured to the axle at 57. Nuts 58 connect the bolt 55 to the block 53.

It will be seen from this construction that I have provided a universal joint between the torque arm 56 and the support 47. An up and down movement of the axle 8 will cause the trunnions 52 to rotate in the ears 50 while a rocking movement of the axle 8 in a vertical plane will cause the torque arm 56 to rock on the bolt 55. The universal connection although permitting this movement will at the same time pull the axle 8 along with the trailer 1 and thus relieve all strain from the springs in accomplishing this purpose.

The construction is such that the springs will be free floating on the axles and therefore the applying of the brakes, indicated generally at 59 in Figure 3, will not create torsional strain on the springs. Furthermore the actual pulling connection between the axle and the trailer chassis is not accomplished by the springs, but by the torque arm 56. This will relieve all tension on the springs to move the axle housings when the trailer is pulled. It is for this reason that both ends of the springs may be provided with a slidable connection with end brackets. The torque arms will permit all four wheels to take independent up or down movements according to the contour of the road bed and the shocks caused by these movements will be absorbed by both sets of springs, rather than by just one set.

The springs will have a much longer life since they are free floating on the axle and are slidably connected to brackets at their ends. The torque arms and the springs permit a full oscillating rear-end. The brakes may be applied to the wheels in any position and all of the wheels will uniformly grip the road surface and thus bring the vehicle to a quick stop. The brakes and the tires will last longer because of this uniform application of all of the brakes simultaneous. Since the springs are relieved of all braking and driving torque they will last much longer. The torque arms 56 permit a greater axle oscillation without a binding or twisting movement being imparted to the trailer chassis. Larger brakes may be used with the device since the braking torque is not absorbed by the springs. The arrangement of the springs causes the load to always be equally distributed at both ends of the springs and the springs only perform the single function of carrying the load. The springs do not hold the axles in alignment nor do they absorb any driving load shock.

While I have shown only the preferred form of my invention, it should be understood that various changes or modifications may be made within the scope of the appended claims without departing from the spirit of the invention.

I claim:

1. A tandem axle assembly comprising a chassis, a pair of leaf springs disposed on each side of the chassis, a frame for each pair and having a slidable connection with the adjacent ends of the leaf springs and a pivotal connection with the chassis, means slidably connecting the other ends of the leaf springs with the chassis, a pair of axles, each axle being rotatably connected to the centers of the leaf springs, a radius rod connected to each axle, and means connecting each radius rod to the chassis for permitting the axles to freely move toward and away from the chassis and to permit either end of each axle to move independently of the other end.

2. The combination with a chassis, of a pair of springs mounted on each side of the chassis, means slidably connecting the ends of the springs to the chassis, a pair of axles rotatably carried at the midpoints of the springs, said springs permitting the axles to oscillate, torque arms connecting the axles with the chassis for permitting the axles to oscillate in a vertical plane only, and brakes mounted on the ends of the axles.

3. In combination, a chassis, a pair of springs disposed on each side of the chassis, a frame for each pair and being slidably connected to the inner ends of the springs and rotatably carried by the chassis, means slidably connecting the outer ends of the springs with the chassis, a pair of axles rotatably supported by the springs, combined torque and radius arms connected to the axles, joints connecting the arms with the chassis and permitting movement of the axle toward and away from the chassis, either end of the axle being able to move independently of the other end, and brakes mounted on the axles.

4. A tandem axle assembly comprising a chassis, a pair of axles, wheels supporting the axles, a separate brake for each wheel, leaf springs rotatably mounted on the axles, an equalizing member mounted between the pairs of springs on each side of the chassis, the spring ends disposed nearest the equalizing members being slidably connected therewith, brackets carried by the chassis and having a sliding connection with the other ends of the springs, a radius rod rigidly connected to each axle, and joints pivotally connecting each radius rod to the chassis, said joints holding the axles against oscillation in a horizontal plane while permitting them to freely oscillate in a vertical plane.

5. An axle assembly comprising a chassis, leaf springs for supporting the chassis, means slidably connecting both ends of each leaf spring with the chassis, an axle, means connecting the axle with the centers of the springs with freedom of turning movement of the axle with respect to the springs, a radius rod connected to the axle, and a pivotal connection between the radius rod and the chassis arranged for free vertical movement of the axle and either end of the latter relative to the chassis, the radius rod and said connection being made to hold the ends of the axle against shifting in opposite directions with respect to each other in a horizontal plane.

6. An axle assembly for a vehicle comprising a pair of normally curved leaf springs, means slidably connecting both ends of each spring to a frame of the vehicle and arranged to shorten the effective lengths of the springs when the latter are flattened, thereby increasing the resistance of the springs in absorbing shocks, an axle rotatably carried by the springs at their midpoints, and a torque arm rigidly connected to the axle and pivotally connected to the frame, said pivotal connection to the frame permitting free vertical movement of the axle and either end of the latter relative to the frame, but preventing the ends of the axle from shifting in opposite directions with respect to each other in a horizontal plane.

7. The combination with a vehicle chassis, of a leaf spring disposed on each side of the chassis, means slidably connecting both ends of each spring with the chassis, an axle rotatably carried by the springs, a combined torque arm and radius rod connected to the axle, a joint connecting the arm to the chassis and arranged for free movement of the axle and either end of the latter toward and away from the chassis, the torque arm and said joint being made to hold the ends of the axle against shifting in opposite directions with respect to each other in a horizontal plane, and brakes mounted on the ends of the axle.

MILTON J. KONETSKY.